(12) United States Patent
Nagasawa

(10) Patent No.: US 6,441,821 B1
(45) Date of Patent: Aug. 27, 2002

(54) METHOD AND APPARATUS FOR DISPLAYING THREE-DIMENSIONAL IMAGE BY USE OF TENSOR RENDERING

(75) Inventor: Mikio Nagasawa, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/347,419

(22) Filed: Jul. 6, 1999

(30) Foreign Application Priority Data

Jul. 3, 1998 (JP) .......................................... 10-202834

(51) Int. Cl.$^7$ ............................................... G06T 15/50
(52) U.S. Cl. ....................... 345/426; 345/424; 345/440; 345/441
(58) Field of Search ................................. 345/426, 424, 345/440, 441

(56) References Cited

U.S. PATENT DOCUMENTS 5,539,310 A    7/1996    Basser et al.

FOREIGN PATENT DOCUMENTS

JP    7-27576    3/1995

OTHER PUBLICATIONS

Laidlaw et al. 1998. Visualizing Diffision Tensor Images of the Mouse Spinal Chord. Visualization 98, Proc. IEEE. pp. 127–134 and 527.*
"A Probe for Local Flow Field Visualization", W. deLeeuw et al, IEEE Visualization 93, pp. 39–45.
"Determination of Unknown Particle Charges in a Thunder Cloud Based Upon Detected Electric Field Vectors", D. Drake et al, IEEE Visualization 97, pp. 479–482.
"Singularities in Nonuniform Tensor Fields", Y. Lavin et al, IEEE Visualization 97, pp. 59–66.

* cited by examiner

Primary Examiner—Mark Zimmerman
Assistant Examiner—Philip H. Stevenson
(74) Attorney, Agent, or Firm—Antonelli, Terry, Stout & Kraus, LLP

(57) ABSTRACT

In order to visually display a spatial distribution of a multi-value function represented by nine components of a two-order, three-dimensional tensor, a distribution function of an anisotropic fine face distribution is set to have a form of a second-order curved surface of an anisotropic ellipsoid associated with discrete sampling points, the intensity of the scattering light is calculated from a contribution of a bisector-direction vector between a light-source-directed vector and a line of sight vector (in a reflection light intensity calculating part to simulate the light scattering. With respect to each calculation point having a tensor, the intensity of the scattering light is integrated according to a rendering light beam equation with a light transmittance weighted (in a light beam integration part). As a result, since the correlation between the light integration effect and the angle dependency based on a scattering distribution function associated with the tensor components is displayed, multi-value information in a space can be visually recognized while eliminating the need for pattern recognition or the like. Not a geometrical object but a cloud-like three-dimensional distribution image is obtained as a display image and special anisotropically scattered part are displayed in the image. Therefore, the image is natural as a visual-feeling characteristic, and thus an observer can efficiently recognize it with less fatigue.

8 Claims, 6 Drawing Sheets

METHOD AND APPARATUS FOR DISPLAYING THREE-DIMENSIONAL IMAGE BY USE OF TENSOR RENDERING

BACKGROUND OF THE INVENTION

The present invention relates to a display of general three-dimensional digital data and more particularly, to a method and apparatus for displaying multi-valued component data by use of tensor rendering, which can be used, e.g., for applications which follow.

(1) General tensor scientific data analysis;

(2) Statistical data analysis using a multi-value function;

(3) Representation of metallic texture in computer graphics; and (4) Internal structure diagnosis using a magnetic resonance imaging (MRI) apparatus.

As a prior art for visually displaying a scalar field, there is a scalar volume rendering method (refer to JP-B-7-27576 by Pixar Ltd.). In a three-dimensional shape displaying method used in an ordinary computer graphics, for the purpose of displaying a three-dimensional scalar field by providing spatial coordinate points such as apexes of a three-dimensional figure and by geometrically displaying a polyhedron, it is necessary as its pre-stage to determine an isosurface (iso-density surface, iso-pressure surface, etc.) corresponding to a two-dimensional contour line.

That is, the scalars of three-dimensional lattice points are given to calculate coordinate data including the apexes, ridge lines and face orientations of polygons of isosurface in a three-dimensional space, and resultant polyhedron data are hidden-surface-processed for display. In the scalar volume rendering method, on the other hand, a radiative transfer equation is approximately solved to represent the concentration of a spatial density without determining the surfaces of a three-dimensional figure.

This method which represents a shape as a degree of opacity is featured in that since the operation of determining an isosurface involves no data round-down based on a threshold, the quality of input data reflects on the quality of a display image as it is. However, this method uses only a radiation-transportation model of a scattering light for relating a single function to opacity or color and uses no such a scattering light model as able to cope with multi-valued component data of a multi-value function. For this reason, for displaying the multi-valued component data, the method requires not only the repetition of volume-rendering-calculation for each of the multi-valued component data, demanding a massive amount of calculation, but also a post-processing for comparison of an image to be displayed.

Another prior art method for displaying multi-valued component data of a multi-value function is a method for displaying a three-dimensional icon (see IEEE Visualization 93, pp.39–45) as an image. In this method, a distribution of three-dimensional multi-valued component data is displayed by displaying as an image the situation in which a three-dimensional icon object having a freedom of shape corresponding to the multi-valued component data is positioned in a space. However, since the shape of the three dimensional icon object becomes complicated, a limited resolution of display screen disables simultaneous display of a multiplicity of sampling points.

As a result, the multi-valued component data to be displayed are selected, undesirably leading to display of only part of the data to be analyzed.

Another prior art method for displaying multi-valued component data of a multi-value function is a method for simultaneously displaying five three-dimensional components (see IEEE Visualization 97, pp.479–482). In this method, not tensors but two types of scalars and one type of vector are overwritten, and an geometrical object is utilized. Thus, this method is limited to applications where it is desired to display a small number of sampling points.

Also suggested is a method for displaying three-dimensional tensor components (see IEEE Visualization 97, pp.59–66). In this method, features are extracted from a distribution of nine components of a three dimensional tensor amount to three-dimensionally display its extracted result. This method, however, is suitable for such a purpose as to display the features of a multi-value function. However, this metod cannot be used for such a purpose as to detect fine defects from the entire multi-valued component data, because most of the data are subjected to the selecting operations prior to displaying.

The present invention may be applied to an internal structure diagnosis apparatus using a magnetic resonance imaging (MRI) system for a sample having a spin component.

In such MRI systems, there is already known a method for finding a diffusion tensor indicative of a displacement in the spin component of the sample based on a spin-echo intensity (see U.S. Pat. No. 5,539,310).

In ordinary MRI systems, since the applied electromagnetic pulse and the diffusion tensor component have a specific relationship therebetween, a three-dimensional tensor amount is output based on the magnetic resonance data measured in voxel unit.

However, in order to display the tensors of the three-dimensional diagnosis result, there has been conventionally used a method for two-dimensionally displaying only a partial section or a projection component.

In the conventional scalar volume rendering method, it has been difficult to grasp the correlation between multi-valued components in the component analysis based on reading of numeral value data, since the method displays only three dimensional one variable data.

The conventional method for displaying a three-dimensional icon as an image has a limit in resolution, because the method is of a geometrical figure display type based on sample extraction and cannot display all the data. Further, with respect to display, a polygon indicative of an icon has to be displayed in color and cannot be visualized on a monochrome display screen. Moreover, since shading is used regardless of display information, multi-valued components having a large value change range cannot be undesirably displayed.

SUMMARY OF THE INVENTION

The present invention has five objects that provide a method and apparatus for displaying high-dimensional (e.g., three-dimensional) digital data by use of tensor rendering which has the following functions and effects (1) to (5).

(1) Component correlation can be easily grasped by providing a user interface for diagnostic analysis of multi-valued component data and by providing such display as to directly appeal to human vision, such as emphasized display of featured locations;

(2) Lack and Missing of multi-valued component data analysis can be prevented to improve an efficiency in the entire data analysis;

(3) A tensor distribution over an entire three-dimensional space can be visualized;

(4) Display is carried out in conformity with tensor characteristics for use as general input data of scientific computation; and (5) High-speed display can be realized by parallel-processing the rendering computation for displaying.

To attain the above first to fifth objects and correspondingly obtain the above functions and effects (1) to (5), the following means (a) to (e) are provided.

(a) For the purpose of realizing three-dimensional image display to allow an observer to conduct the data diagnosis by a technique for visualizing a distribution of components in a space, the anisotropic scattering of light permeated and absorbed is used, as an index of multi-valued information diagnosis.

(b) Since it is difficult to directly represent a large amount of sampling points in the form of a geometrical figure, a multi-valued component input is normalized into an opacity distribution and its optical attributes. A space is defined as a set of small fine faces having opacity, brightness and scattering vectors, and light absorbed and scattered on the faces are numerically calculated.

In FIG. 1, more specifically, a very small virtual face distribution 102 having an anisotropy is corresponded on a discrete sample region unit 103 having tensor amount. A shape of a very small face distribution function 101 necessary for simulation of light scattering by the very small virtual face distribution 102 having an anisotropy is assumed as two-order curved surface of an anisotropic ellipsoid. An intensity of the scattering light is calculated based on a contribution of a vector 107 directed to a direction of a bisector between a light-source-directed vector 105 and a line of sight vector (view direction vector) 106.

(c) To specify multi-valued components representing an opacity, it is assumed as an opacity control principle of tensor rendering that light passed through an anisotropic ellipsoid is absorbed according to its optical path length.

With respect to each computation point having a tensor, the intensity of the absorbed light is integrated according to the following rendering light beam equation (Equation 5), the transmittance of the scattering light is weighted.

$$C_\lambda(u_i) = \sum_{k=0}^{k} \left[ c_\lambda(x_k) \alpha(u_i, x_k) \prod_{m=k+1}^{k} (1 - \alpha(u_i, x_k)) \right] \quad \text{(Equation 5)}$$

The rendering integration causes nine tensor components of each point in the space to be output to a display image as light information.

(d) Mapping of a tensor type of three-dimensional multi-valued component input data is carried out by sorting the input data into the symmetrical tensor components and the anti-symmetrical tensor components (or by splitting or decomposing the input data, if the sorting is impossible).

(e) For speeding up of the tensor rendering, parallel control is employed. The light simulation computation (especially, rendering light beam integration) can be subjected to the parallel operation, whereby the expandability of resolution and so forth can also be secured.

DESCRIPTION OF THE PREFERRED EMBODIMENTS

Figure 2:
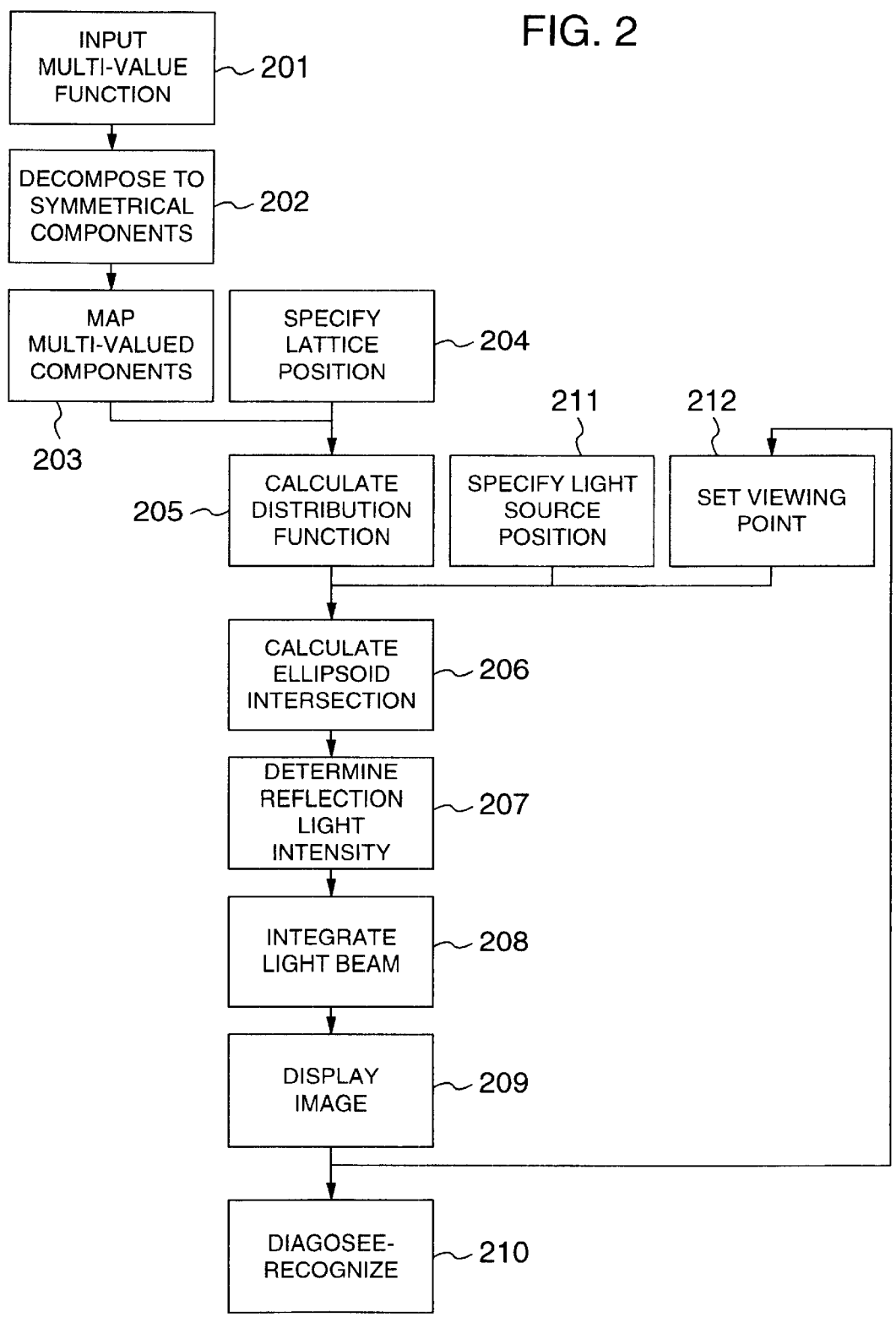
FIG. 2 is a flowchart showing a processing procedure of tensor rendering diagnostic analysis.

An ordinary computer system is employed which comprises a data processing system including a multi-value function data input part, a data processing part and an image data output display part, and also comprising a user interface for input of instructions for necessary parameter control. The data processing is realized in accordance with a flowchart shown in FIG. 2.

Figure 1:
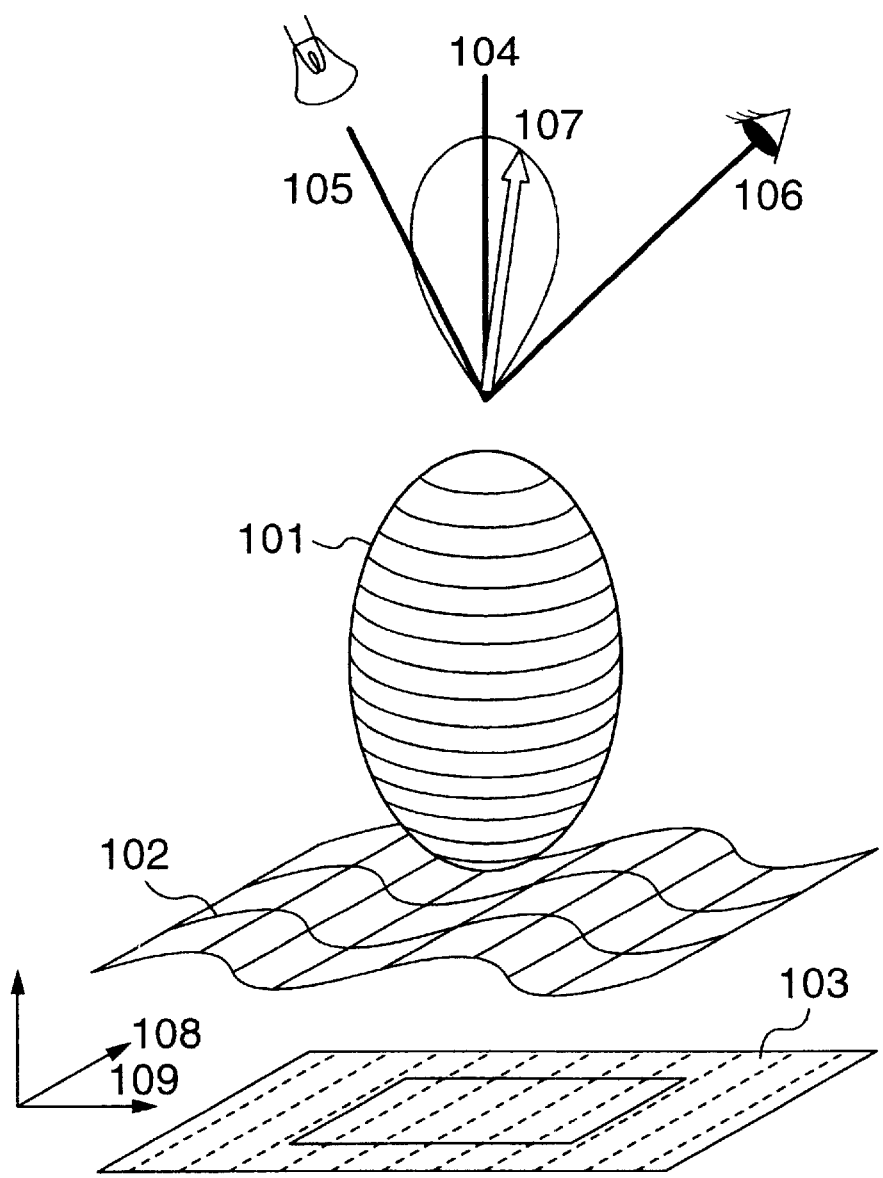
FIG. 1 shows a structure of a multi-valued component visualization using an anisotropic ellipsoid.

A high dimensional multi-value function is input (block 201). The luminance of the reflection light is specified on the basis of an opacity according to a path length of light traversed through the anisotropic ellipsoid. The input based on the anisotropic ellipsoid is of a non-geometrical data type. In the present embodiment, as shown in FIG. 1, the opacity and the scattering light vector as the light reflection direction are controlled directly by the discrete sample region unit 103 having three-dimensional two-order tensor amount.

Tensor type multi-valued component data of the input multi-value function are sorted into symmetrical tensor components and anti-symmetrical tensor components (or by decomposing the input data, if the sorting is impossible) (block 202).

Such an input method is employed as to map the tensor type multi-valued components as shape coefficients (σ and ω in Equation 2) of the anisotropic ellipsoid (block 203), that is, by relating the tensor components to the shape, i.e., axial length of the anisotropic ellipsoid. This causes the determination of the opacity and orientation corresponding to the input components.

The anisotropic ellipsoid is used to determine the scattering (reflecting) intensity of the light (block 207), and corresponds to non-geometrical data. As a result, a geometrical object as the ellipsoid is not displayed.

Examples of velocity-stress tensor (Equation 1) in fluid mechanics often used in engineering include a stress tensor (Equation 3) as a symmetrical tensor, an anti-symmetrical tensor (Equation 4) such as vorticity, and so forth.

When the general multi-valued components are mapped to the ellipsoid, it is necessary to discriminate between the closed curved surface and the open curved surfaces. However, most of ordinary physical tensors correspond to a closed two-order curved surface to ensure a diagonal dominance. This is an anisotropic ellipsoid (Equation 2).

$$J = \frac{\partial(v_x, v_y, v_z)}{\partial(x, y, z)} = \begin{pmatrix} \frac{\partial v_x}{\partial x} & \frac{\partial v_y}{\partial x} & \frac{\partial v_z}{\partial x} \\ \frac{\partial v_x}{\partial y} & \frac{\partial v_y}{\partial y} & \frac{\partial v_z}{\partial y} \\ \frac{\partial v_x}{\partial z} & \frac{\partial v_y}{\partial z} & \frac{\partial v_z}{\partial z} \end{pmatrix} \quad \text{(Equation 1)}$$

-continued $$\frac{x^2}{\sigma_{xx}} + \frac{y^2}{\sigma_{yy}} + \frac{z^2}{\sigma_{zz}} + \frac{xy}{\sigma_{zy}} + \frac{yz}{\sigma_{yz}} + \frac{zx}{\sigma_{zx}} + \frac{x}{\omega_x} + \frac{y}{\omega_y} + \frac{z}{\omega_z} = 1 \quad \text{(Equation 2)}$$

$$\sigma_{ij} = \left(\frac{\partial v_i}{\partial x_j} + \frac{\partial v_j}{\partial x_i}\right) \quad \text{(Equation 3)}$$

$$\omega_k = \varepsilon_{ijk}\frac{\partial v_i}{\partial x_j} \quad \text{(Equation 4)}$$

Similarly, as a light scattering element capable of coping with multi-valued components, a scattering light model can be used which is based on an orthorhombic crystal (Equation 7) calculated from the auxiliary functions of Equations 8 to 11. In this case, vectors N, V, V', H, H' and T in Equation 6 for definition of inner or scalar product indicate a normal-direction vector 104, a light-source-directed vector 105, a line of sight vector 106, a bisector-direction vector 107, a tangential-direction vector 108 and an in-plane anisotropic axis vector 109 in FIG. 1, respectively.

$$t=(H\cdot N),$$
$$u=(H\cdot V),$$
$$v=(V\cdot N), \quad \text{(Equation 6)}$$
$$v=(V'\cdot N),$$
$$w=(T\cdot H'),$$
$$v=(V\cdot N),$$

$$C_\lambda(fx_k) = R_\lambda(t,u,v,v',w) = S_\lambda(u)D(t,v,v',w) \quad \text{(Equation 7)}$$

$$S_\lambda(u) = C_\lambda + (1-C_\lambda)(1-u)^5 \quad \text{(Equation 8)}$$

$$D(t, v, v', w) = \frac{G(v)G(v')}{4\pi vv'}Z(t)A(w) + \frac{1-G(v)G(v')}{4\pi vv'} \quad \text{(Equation 9)}$$

$$G(v) = \frac{v}{r-rv+v},\quad G(v') = \frac{v'}{r-rv'+v'} \quad \text{(Equation 10)}$$

$$Z(t) = \frac{r}{(1+rt^2-t^2)^2},\quad A(w) = \sqrt{\frac{p}{p^2-p^2w^2+w^2}} \quad \text{(Equation 11)}$$

Further, the scattering light due to three sets of three-dimensional vectors and so forth can be used.

The mapping input as the shape coefficients of the anisotropic ellipsoid in the block 203 causes the distribution function at a lattice position specified as a discrete point in the three-dimensional space in a block 204 to be calculated (block 205). On the basis of the distribution function, an ellipsoid intersection of the light source position specified in a block 211 and the sight line set in a block 212 is calculated (block 206).

Since the resolution of the tensor rendering is improved according to the bit length in the luminance direction, even when the resolution of the image display (block 209) is low, a high quality sufficient for the diagnostic recognition (block 210) can be obtained. This corresponds to such a case that a dithering method used in a multicolor printer is reversely utilized with use of a high pixel resolution.

In this connection, light beam integration calculation (block 208) executed by weighting the anisotropic ellipsoid is suitable for the parallel calculation, because the integration can be dividedly carried out for each light beam.

Figure 5:
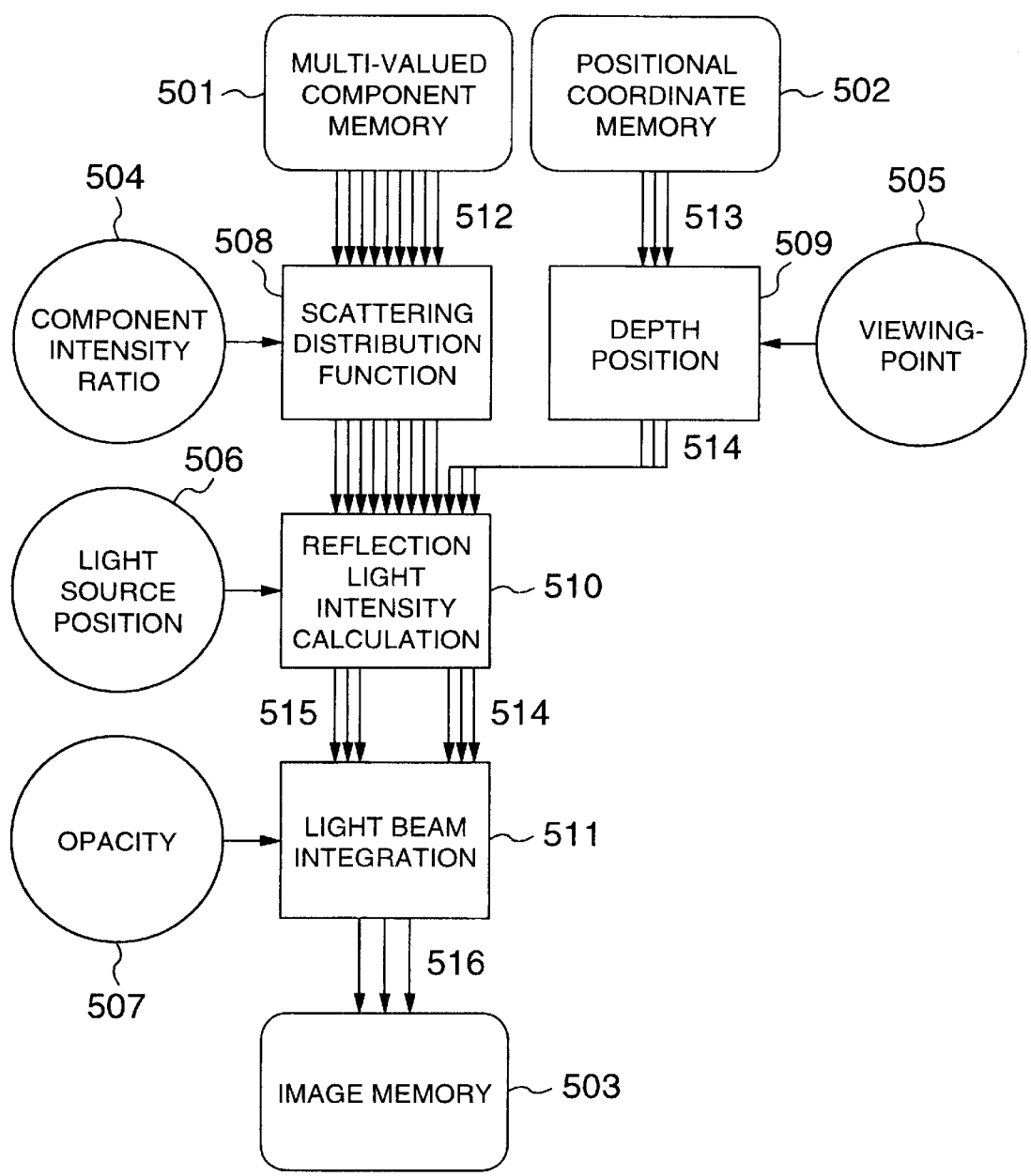
FIG. 5 is a block diagram of an arrangement of a multi-value function display apparatus in accordance with the present invention.

Explanation will next be made as to an exemplary arrangement of a display apparatus using the anisotropic scattering in accordance with the present invention. As shown in FIG. 5, the exemplary arrangement of the present invention includes storage memories (501 to 503) for holding input/output data therein, interfaces (504 to 507) through which control parameters are input, operating parts (508 to 511), and data (512 to 516) being transmitted through a data communication system such as a network. With respect three-dimensional tensor data 512 of multi-valued components read out from the multi-valued component memory 501 holding multi-value function data values therein, an anisotropic scattering contribution ratio is set as a parameter on the basis of a component 504 and an anisotropic scattering ratio at each data sampling point is calculated in the scattering distribution function calculation part 508 according to the scattering distribution function. The three-dimensional coordinate data 513 read out from the positional coordinate memory 502 holding the spatial position coordinate values of the sampling point therein is subjected in a depth position calculation part 509 to a three-dimensional coordinate converting operation according to a sight line position set by a viewing-point setting device 505 to generate converted coordinate values and the list vectors 514 in an order of the viewing depth direction. When the position of an external light source is set by a light source position setting device 506, components 515 of the reflection light and scattering light at each data sampling point are calculated in the reflected-light intensity calculating part 510 according to the anisotropic scattering ratio at each data sampling point output from the scattering distribution function calculation part 508. The light beam integration calculation part 511 integrates the quantities of permeated light in the viewing depth order corresponding to the generation order of the list vectors 514 according to an opacity set by the opacity setting device 507. Its integrated results become three primary color signals of color brightness in a two-dimensional image, and are written in the output image memory 503 as the image data 516.

Further, the image data read out from the output image memory 503 are converted and output to a display output device (not shown) such as a CRT motor, a liquid crystal monitor or a color printer.

Finally shown as another application example of the present invention is an apparatus which displays a distribution of three-dimensional structure defects in an image obtained from the MRI apparatus based on an ordinary computer system. The display apparatus will be explained with reference to FIG. 6.

In the internal structure diagnosis of a sample having a spin component with use of the MRI apparatus, when diffusion tensors are displayed using the display method of the present invention, an observer can visually recognize a distribution state of many three-dimensional component elements at a glance and can find a three-dimensional structural defect based on the detection of an abnormal spin location with a high efficiency.

Figure 6:
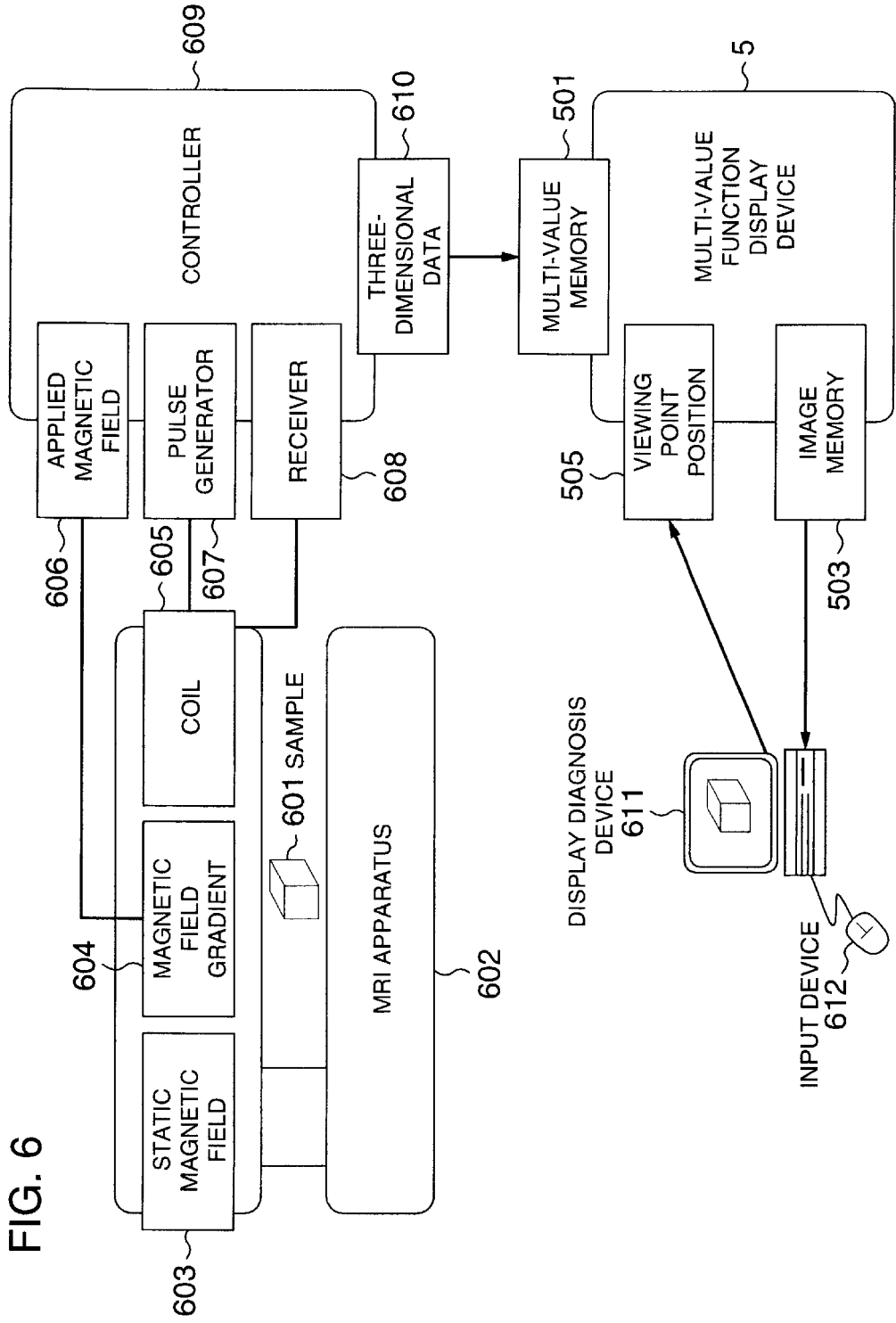
FIG. 6 is a block diagram of an arrangement of a three-dimensional structure defect distribution display apparatus to which the present invention is applied.

As shown in FIG. 6, an MRI apparatus 602 holding a test sample 601 includes a uniform static magnetic field generator 603, a magnetic field gradient generator 604 and a coil 605 for reception and transmission of an electromagnetic signal. A application-magnetic-field controller 606 for controlling the intensity or gradient of a magnetic field to be applied, generates a magnetic field gradient 604 to create such a magnetic field environment as to be able to measure a spin echo. A pulse generator 607 connected to the coil 605 acts to apply an exciting magnetic field generated by the coil 605. An electromagnetic signal indicative of a spin echo from the sample is received by the coil 605 and sent to a receiver 608 where the signal is converted. The received spin echo signal is reconstructed into three-dimensional multi-component data 610 in a controller 609 which performs the correlation processing between the received spin echo signal and the applied pulse signal.

The three-dimensional multi-component data 610 is applied to a multi-value function display device 5 to be stored in the multi-valued component memory 501. A rendering result of the three-dimensional multi-valued components is output to the image memory 503 as two-dimensional image data.

Data output from the image memory 503 is sent to a display diagnosis device 611 such as a CRT monitor, and then converted. The observer, using an input device 612 such as a mouse, interactively or automatically operates the three-dimensional display parameters, e.g. moves a viewing point position 505. Through the operations including the viewing-point movement, the information observer can diagnostically find an abnormality in the three-dimensional distribution by visually recognizing the abnormality in the brightness characteristic caused by the effect of the anisotropic scattering light on the display diagnosis device 611.

Further, when a three-dimensional coordinate system as a reference is displayed on the display screen together with the data, the defect position can also be identified.

The present invention has the following effects (1) to (6).

Figure 3:
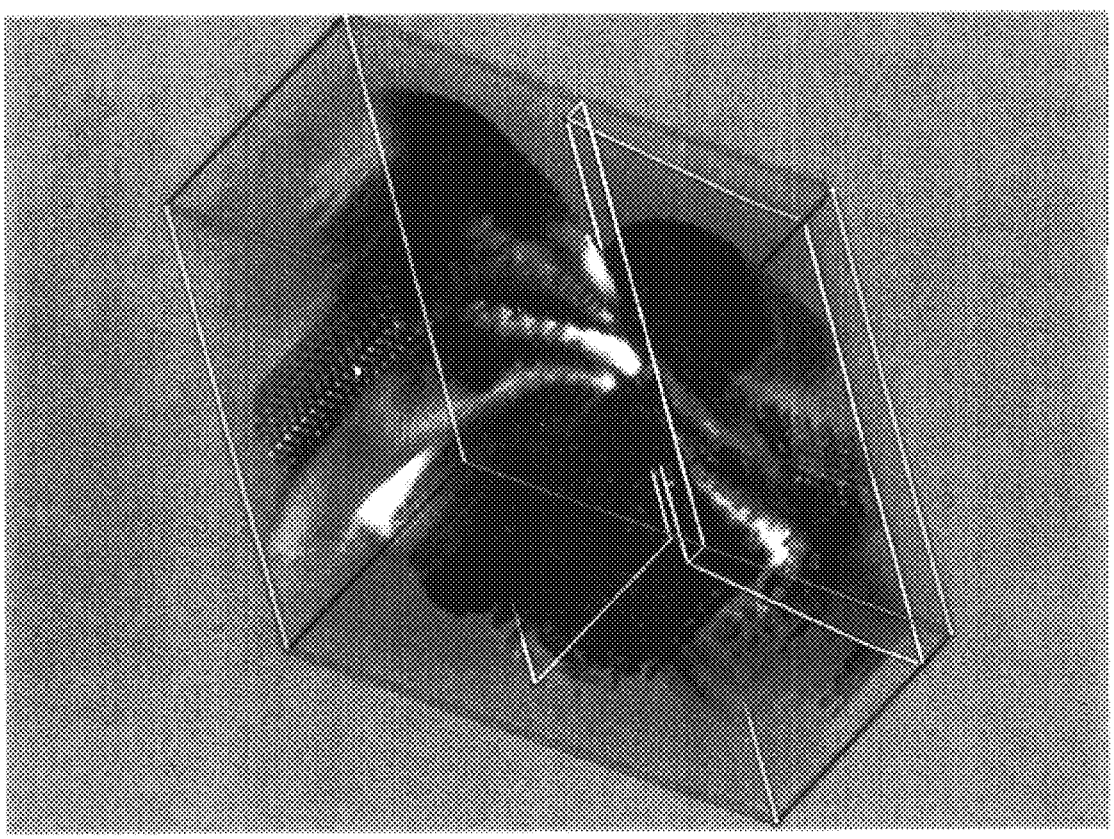
FIG. 3 shows an example of tensor rendering display (an earthquake wave stress tensor)

(1) Since the multi-valued component distribution functions as a light anisotropic scattering medium and a value given thereto functions as a three-dimensional information source in the tensor rendering, a three-dimensional image can be obtained. A display image is not a geometrical object but a cloud-like three-dimensional distribution image and special anisotropic scattered parts in the image are displayed as shown in FIG. 3. Therefore, the image is natural as a visual feeling characteristic, and thus the observer can efficiently recognize it with less fatigue.

(2) Since multi-valued component data as a target is normalized as light scattering data, the correlation between the light integration effect and the scattering angle dependency according to the scattering distribution function related to the tensor components is displayed as the correlation between pixels, multi-value information in the space can be recognized. There can be provide an interface to images of various types of data such as discrete sampling point data of a continuous distribution not limited to a geometrical figure. With respect to the adjustment of grayscale visual recognition ability and feature readability, the adjustment can be dynamically realized by adjusting the light parameter control mechanism. This means that the ability of distinguishing a multi-valued component distribution to be analyzed can be enhanced according to the quality of a visualized image of an opaque medium.

Figure 4:
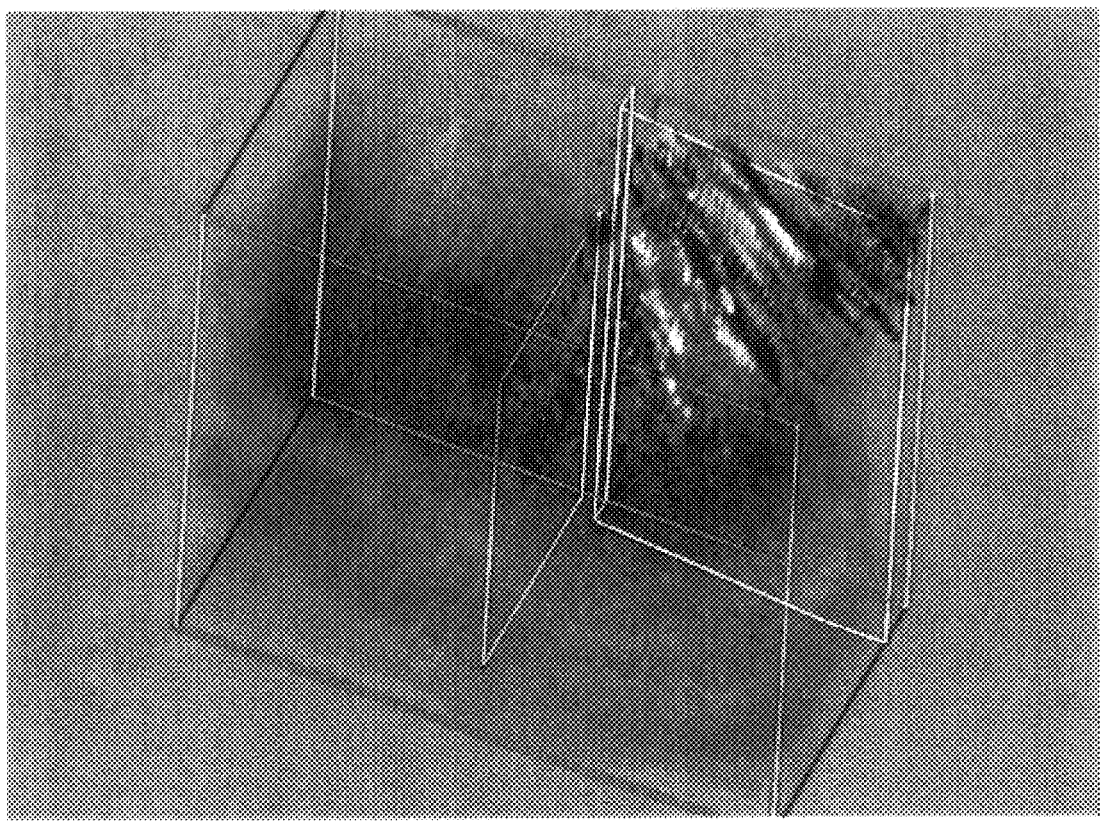
FIG. 4 shows an example of tensor rendering display of a part of FIG. 3 due to a parameter modification.

(3) Light simulation enable s embedding of more information quantity in a unit pixel. As a result, since all the data can be visualized without any missing of the data, the efficient data analysis can be realized. Since the visualization output simulates a three-dimensional continuous medium, the omni-directional display and depth observation by the viewing point movement can be simultaneously realized. The integration of the opaque medium in the sight line direction can be naturally carried out through observer's recognition so that a three dimensional image can appear as a zone having a constant optical depth, i.e., a cloud-like region. In this case, this completely eliminates the need for an auxiliary calculation algorithm such as pattern recognition, not only parameters are changed according to the quality of a visualized image of the opaque medium, but also the ability of distinguishing a multi-valued component distribution of a local part to be analyzed can be enhanced as shown in FIG. 4.

(4) The tensor rendering uses the anisotropic ellipsoid as a scattering element having a highly versatility, and thus can cope with input of various types of multi-valued data widely used in measurement experiences and general numeral value computations.

Further the digital input enables the prevention of data degradation.

(5) Since the input data is normalized based on its symmetry, the mapping unstability at the time of mapping the three-dimensional spatial distribution of a multi-value function to the parameters of an anisotropic ellipsoid can be reduced for the efficient input. Further, a metal surface or the like tending to undergo a stress distortion can be realistically represented.

(6) The drawing operation can be carried out at high speed through the efficient parallel operation utilizing the light beam independency.

What is claimed is:

1. A method for displaying three-dimensional digital data due to a tensor rendering, wherein
light beams are related to a tensor independent element by a direct tensor rendering utilizing a scattering light model indicative of an anisotropic scattering of a transmitting light beam absorbed according to an optical path length to display a multi-value function.

2. A method for displaying three-dimensional digital data due to a tensor rendering, wherein
a transmittance of a light beam having components directly related to a tensor independent element is calculated by a direct tensor rendering utilizing an anisotropic scattering of a transmitting light beam absorbed according to an optical path length; and
a three-dimensional spatial distribution of a multi-value function represented by a typical three-dimensional tensor amount corresponding to the calculated transmittance of the light beam is displayed.

3. A method for displaying three-dimensional digital data due to a tensor rendering as set forth in claim 2, wherein
said transmittance of the light beam is calculated based on said tensor independent element by a tensor rendering utilizing a second-order curved surface scattering of an anisotropic ellipsoid.

4. A method for displaying three-dimensional digital data due to a tensor rendering as set forth in claim 3, wherein
said calculating operation includes an operation of sorting a tensor type of multi-valued component data into symmetrical tensor components and anti-symmetrical tensor components, an operation of mapping the sorted multi-valued component data to said anisotropic ellipsoid, and an operation of relating said tensor independent element to an anisotropic scattering light element.

5. A method for displaying three-dimensional digital data due to a tensor rendering as set forth in claim 2, wherein
said displaying operation includes an operation of displaying a result of light simulation calculation including a rendering light beam integration, said light simulation calculation being executed in a parallel manner.

6. An apparatus for displaying three-dimensional digital data due to a tensor rendering, comprising:
means for inputting multi-valued component data represented by a three-dimensional tensor amount, to calculation means;

means for calculating a transmittance of light having a component directly related to a tensor independent element due to a direct tensor rendering utilizing an anisotropic scattering of a transmitting light beam absorbed according to an optical path length; and means for displaying a three-dimensional spatial distribution of a multi-value function represented by a three-dimensional tensor amount corresponding to the calculated transmittance of the light.

7. A method for displaying a multi-value function due to a tensor rendering utilizing a light anisotropic scattering to be applied to an image diagnosis analysis, comprising the steps of:

(1) inputting a high-order multi-value function;

(2) decomposing a tensor type of multi-valued component data of the input multi-value function into symmetrical tensor components and anti-symmetrical tensor components;

(3) mapping the decomposed multi-valued component data to parameters of an anisotropic ellipsoid;

(4) calculating a scattering distribution function of the anisotropic ellipsoid based on a result of said mapping and a pre-specified lattice position;

(5) executing the tensor rendering on the basis of said scattering distribution function, a specified light source position and a set viewing-point position; and (6) visibly displaying a tensor component at each lattice position as light information.

8. An apparatus for displaying a multi-value function due to a tensor rendering utilizing a light anisotropic scattering, comprising:

(1) first memory means for storing three-dimensional tensor data of multi-valued components;

(2) second memory means for storing position coordinate values of each data sampling point;

(3) component intensity ratio setting means for setting an anisotropic scattering contribution ratio as a parameter;

(4) scattering distribution function calculation means for calculating an anisotropic scattering ratio for each data sampling point with respect to the three-dimensional tensor data read out from said first memory means on the basis of said set component intensity ratio;

(5) depth position calculation means for coordinate-converting the position coordinate value stored in said second memory means according to the set viewing-point position to generate list vectors in an order of a viewing depth direction;

(6) reflection light intensity calculation means for calculating a component of reflection scattering light at each data sampling point according to the anisotropic scattering ratio calculated by said means with respect to a set position of an external light source;

(7) light beam integration calculation means for integrating the quantity of light transmitting according to a set opacity, in the order of the viewing depth direction corresponding to the list vector generation order in said means; and (8) third memory means for storing a result of said integration as image data.

* * * * *